United States Patent [19]

Shinohara

[11] Patent Number: 4,811,226

[45] Date of Patent: Mar. 7, 1989

[54] OPTIMUM ANGLE ADJUSTING APPARATUS FOR VEHICLE EQUIPMENTS

[75] Inventor: Toshio Shinohara, Aichi, Japan

[73] Assignee: Toyota Jidosha Kogyo Kabushiki Kaisha, Toyota, Japan

[21] Appl. No.: 139,121

[22] Filed: Dec. 23, 1987

Related U.S. Application Data

[63] Continuation of Ser. No. 22,595, Mar. 4, 1987, abandoned, which is a continuation of Ser. No. 873,271, Jun. 6, 1986, abandoned, which is a continuation of Ser. No. 774,383, Sep. 10, 1985, abandoned, which is a continuation of Ser. No. 305,356, Sep. 24, 1981, abandoned.

[30] Foreign Application Priority Data

Sep. 30, 1980 [JP] Japan ................................ 55-136893
Aug. 24, 1981 [JP] Japan ................................ 56-132307

[51] Int. Cl.$^4$ ............................................. G06F 15/20
[52] U.S. Cl. ................................ 364/424.05; 318/466; 296/65.1
[58] Field of Search ................ 364/424, 425; 318/466, 318/467, 468; 296/64, 65 R

[56] References Cited

U.S. PATENT DOCUMENTS

| | | | |
|---|---|---|---|
| 4,204,255 | 5/1980 | Cremer | 364/425 |
| 4,401,928 | 8/1983 | Kamijo et al. | 318/467 |
| 4,404,632 | 9/1983 | Harada et al. | 318/466 |
| 4,434,468 | 2/1984 | Caddick et al. | 364/424 |
| 4,451,887 | 5/1984 | Harada et al. | 364/425 |

Primary Examiner—Gary Chin
Attorney, Agent, or Firm—Cushman, Darby & Cushman

[57] ABSTRACT

An automatic angle adjusting apparatus for adjusting vehicle equipments to be adjusted to optimum angular positions to a driver such as a fender mirror, an inner mirror, blowing ports of an air conditioner, a speaker and a meter is disclosed. Amounts of adjustment of vehicle seat parts are detected by amounts of adjustment detectors and the optimum angles of the vehicle equipments, a height of the driver or an eye position of the driver are calculated based on the detection signals to automatically adjust the vehicle equipments to the optimum angular position. When the height or the eye position of the driver is calculated, the optimum angles are further calculated based on the calculated height or eye position.

10 Claims, 11 Drawing Sheets 30A, 30B

OPTIMUM ANGLE ADJUSTING APPARATUS FOR VEHICLE EQUIPMENTS

This is a continuation of application Ser. No. 022,595, filed Mar. 4, 1987, and which was a continuation of Ser. No. 873,271 filed 06/06/86, which was a continuation of 774,383 filed 9/10/85 which was a continuation of 305,356 filed 9/24/81 which were all abandoned upon the filing hereof.

BACKGROUND OF THE INVENTION

1. Field of the Invention

The present invention relates to an optimum angle adjusting apparatus for vehicle equipment which are to be adjusted to proper angle positions to be used by particular drivers and passengers of a vehicle, such as fender mirrors, inner mirror, air conditioner, speakers and meters.

2. Description of the Prior Art

Typical automotive vehicles have been equipped with much equipment which requires adjustment to proper angle positions depending on the height and location of the driver and passengers of the vehicle. This is shown in FIG. 1, in which a driver seat 2 is arranged in the vehicle compartment. Meters 4 are arranged on the dashboard in front of seat 2 so that they can be perceived by the driver. An air conditioner 6 is shown equipped under the dashboard, and a rear view mirror 8 is shown between seat 2 and the dashboard. Speakers 9 and 11 for a car stereo are shown arranged behind the seat 2. A left and right side view mirror 12 and 10 (also called fender mirrors) are equipped on the outside of the vehicle. It is desirable to adjust all of this equipment to proper angle positions to ensure maximum comfort and utility to the driver and passengers. The rear view mirror 8, for instance, along with the right and left side view mirrors 10 and 12, should be adjusted so that the field of view that they provide is optimal. Unless this equipment is adjusted to the proper angle positions, the rear view field is incomplete. This may lead to a serious accident or worse. Furthermore, if the output ports of the air conditioner 6 and the sound emitting planes of the speakers 9, 11 are not optimized, the driver will drive the car in less than full comfort.

This vehicle equipment has typically been constructed to allow adjustment of the angle either manually, or by a remote control manipulation. However, this vehicle equipment is normally adjusted to the proper angle after the driver has sat down on the seat and adjusted the position of a seat part such as a seat cushion, a seat back or a head rest. Accordingly, the adjustment of the angle of the above-described equipment has been relatively difficult.

SUMMARY OF THE INVENTION

In accordance with the present invention, in order to overcome the above problems, it has been taken into consideration that there is a close relation between the amounts of adjustments of the seat parts or an eye position and physical features of the driver, and the proper angle positions of the vehicle equipment.

It is a first object of the present invention to provide an apparatus for automatically adjusting at least one of the vehicle equipments to an optimum angle position on the basis of at least one basic formula stored in a microcomputer and used to determine a relation between a particular one of the amounts of adjustment of the seat parts and an optimum angle position of one of the vehicle equipments and are corrected in accordance with the amount of adjustment of the seat part.

It is a second object of the present invention to provide an apparatus for automatically adjusting at least one of the vehicle equipments to an optimum angle position by storing values of the optimum angle positions of the vehicle equipments for a height of a driver, applying at least one basic formula for determining a relation between a particular one of the amounts of adjustments of the seat parts and the height of the driver, and correcting the basic formula in accordance with the amounts of adjustment of the seat parts.

It is a third object of the present invention to provide an apparatus for automatically adjusting at least one of the vehicle equipments to an optimum angle position by calculating an eye position of the driver based on the amounts of adjustment of the seat parts.

In order to achieve the above objects, in accordance with a first aspect of the present invention, the present optimum angle adjusting apparatus for the vehicle equipments comprises an adjustment detector for detecting the amounts of adjustments of the seat parts from respective reference positions and for producing a plurality of adjustment signals, a processing circuit which stores at least one of the basic formulas for determining a relation between a particular one of the amounts of adjustment of the seat parts and an optimum angle position of one of the vehicle equipments which are to be adjusted to the optimum angle positions to the driver or passengers and corrects the basic formula in accordance with the amount of adjustment signals to calculate the optimum angle position of at least one vehicle equipment, and a driving apparatus for driving at least one vehicle equipment to the optimum angle positioned based on the output of the processing circuit.

In accordance with a second aspect of the present invention, the present optimum angle adjusting apparatus for the vehicle equipments comprises an adjustment detector for detecting the amounts of adjustment of the seat parts from the respective reference position and for producing a plurality of adjustment signals, a processing circuit which stores at least one of the basic formulas for determining a relation between a particular one of the amounts of the adjustment of the seat parts and a height of the driver and an optimum angle position, of one of the vehicle equipments which are to be adjusted to the optimum angle positions to the driver, corrects the basic formula on the basis of adjustment signals to calculate the height of the driver and calculates the optimum angle position of the at least one vehicle equipment based on the calculated height of the driving apparatus, and a driver for driving the at least one vehicle equipment to the optimum angle position based on the output of the processing circuit.

In accordance with a third aspect of the present invention, the present optimum angle adjusting apparatus for the vehicle equipments comprises an adjustment detector for detecting the amounts of adjustment of the seat parts from the respective reference positions, and for producing a plurality of adjustment signals, a processing circuit for calculating an eye level of a driver on the basis of the signals from the amount of adjustment detector and a driving apparatus for driving at least one of the vehicle equipments to an optimum angle position on the basis of the output of the processing circuit.

According to those features of the present invention, the vehicle equipments which are to be adjusted to optimum angle positions to the driver, such as meters, blowing ports of air conditioner, fender mirrors, inner mirror and both mirror can be automatically adjusted to the optimum angle positions without manual manipulation by the driver.

BRIEF DESCRIPTION OF THE DRAWINGS

The above mentioned features and objects of the present invention will become more apparent by reference to the following description taken in conjunction with the accomanying drawings, wherein like referenced numerals denote like elements, and in which.

DETAILED DESCRIPTION OF THE INVENTION

A first embodiment of the invention is described in detail herein referring to the accompanying drawings. In the following description, an example of adjusting a right fender mirror to an optimum angular position is disclosed. This embodiment uses a basic formula for determining a relation between a forward/backward displacement of a seat 2, as this seat is adjusted by the driver, and the optimum angular position of the right fender mirror 10.

Figure 2:
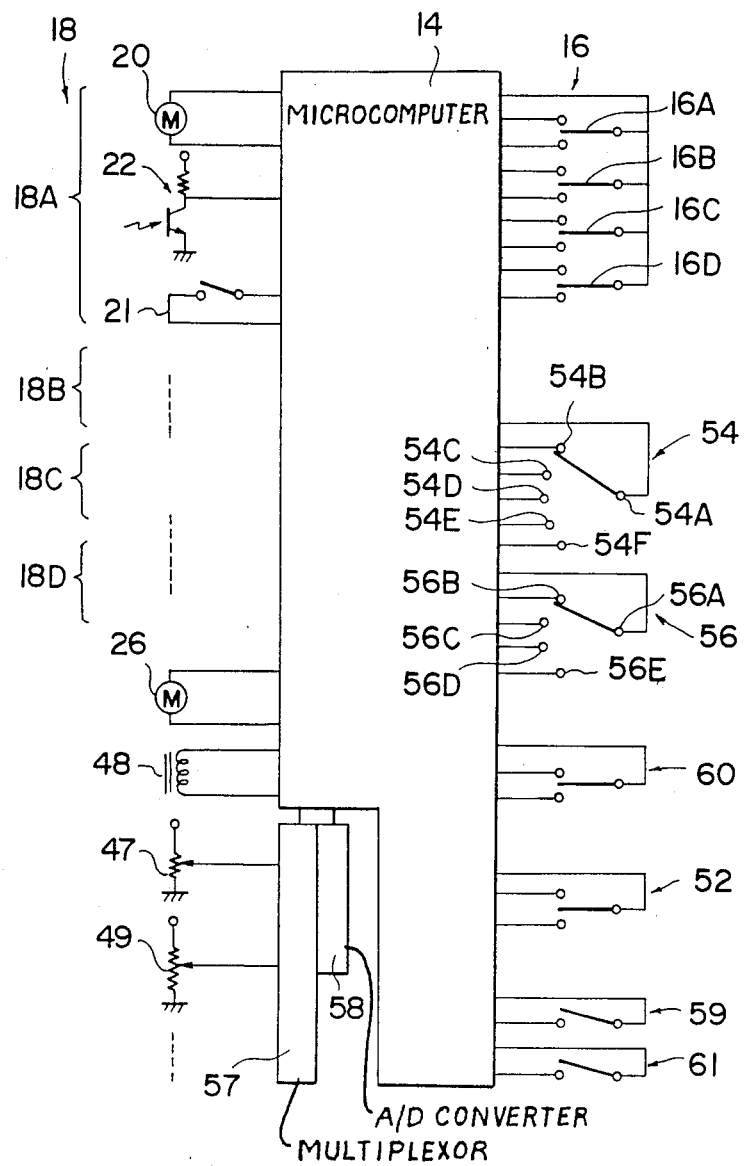
FIG. 2 shows a circuit diagram for explaining embodiments of the present invention.

As shown in FIG. 2, the present embodiment includes a microcomputer 14 which functions as a processing unit. Seat control switch 16 is connected to the microcomputer 14. This switch 16 comprises a seat forward/backward movement switch 16A, a seat backward tilt switch 16B, a head rest upward/downward movement switch 16C and a head rest tilt switch 16D, each of which includes a pair of stationary contacts and a movable contact. Thus, when the movable contact of the seat forward/backward movement switch 16A, for example, is connected to one of the stationary contacts, the seat is commanded to move forward during the contact period of the switch, and when the movable contact is connected to the other stationary contact, the seat is commanded to continuously move backward during the contact period of the switch.

In this manner, the driver of the vehicle can command seat 2 to be displaced to any of its various positions by the actuation of seat control switch 16. By adjusting the seat forward/backward movement, the seat back tilt, the head rest upward/downward movement and the head rest tilt, an optimum driving position can be attained. As shown in FIG. 2, the displacement of the seat is detected by seat displacement detector 18 which comprises a seat forward/backward displacement detector 18A, a seat back tilt displacement detector 18B, a head rest upward/downward displacement detector 18C and a head rest tilt displacement detector 18D, all of which are of similar construction. Each of the detectors includes a photosensor 22 which detects a count corresponding to the number of revolutions of a reversible motor 20 for the seat forward/backward movement, seat back tilt, head rest upward/downward movement or head rest tilt.

Figure 1:
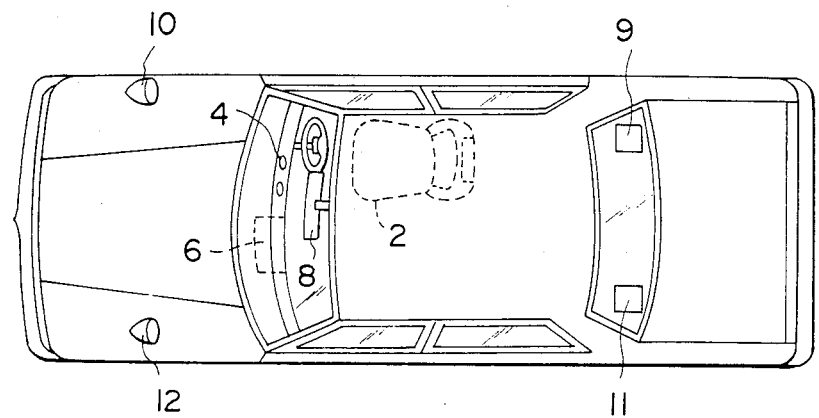
FIG. 1 shows a plan view of a conventional car.
Figure 3:
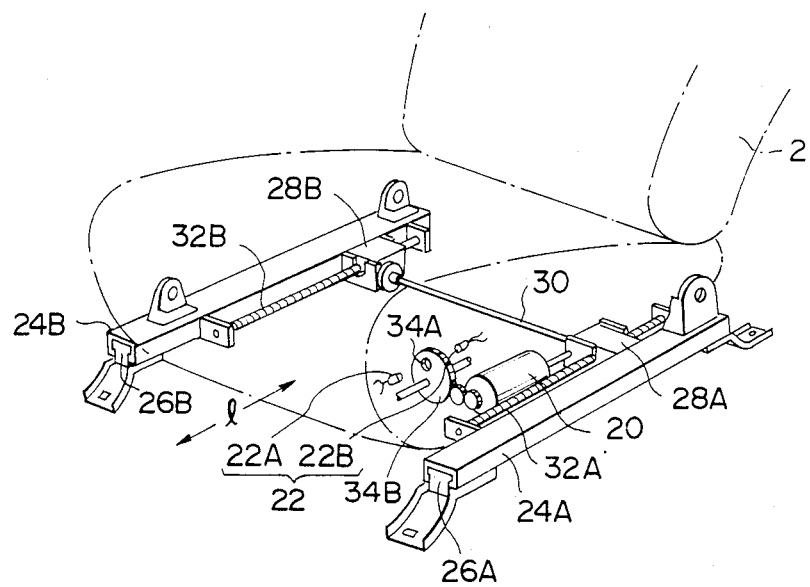
FIG. 3 is a perspective view illustrating a mechanism for displacing a seat forward and backward.

Referring to FIG. 3, a seat forward/backward movement mechanism is shown which has a pair of parallel upper rails 24A and 24B fixed to a bottom of the seat 2 and mounted on a pair of lower rails 26A and 26B fixed to a floor of a car body. The rotation of the reversible motor 20 is transmitted to a worm gear 28A fixed to the one upper rail 24A, thence to a worm gear 28B fixed to the other upper rail 24B, through a torque cable 30. The worm gears 28A and 28B engage with slide screws 32A and 32B, respectively, which are fixed to the upper rails 24A and 24B, respectively. Accordingly, the slide screws 32A and 32B move with the upper rails 24A and 24B by the rotation of the motor 20 which is driven by the actuation of the seat forward/backward movement switch 16A so that the seat 2 fixed to the upper rails 24A and 24B is moved in the direction 1 shown in FIG. 3.

A photo-interrupter 34B is arranged which rotates with the motor 20. The photo-interrupter 34B comprises a circular plate which is rotated by a gear engaged with an output shaft of the motor 20 and which has a light transmitting aperture 34A at a position of the plate. A light emitting element 22A and a photo-sensing element 22B are arranged on opposite sides of the photo-interrupter 34B. to face each other through photo-interrupter 34B. The light emitting element 22A, the photo-sensing element 22B and the photo-interrupter 34B form a photo-sensor element which detects the number of revolutions of the photo-interrupter 34B rotated with the motor 20 rotates by sensing a light emitted from the light emitting element 22A on light receiving element 22B transmitted through the light transmitted aperture 34A of the photo-interrupter 34B.

Figure 4:
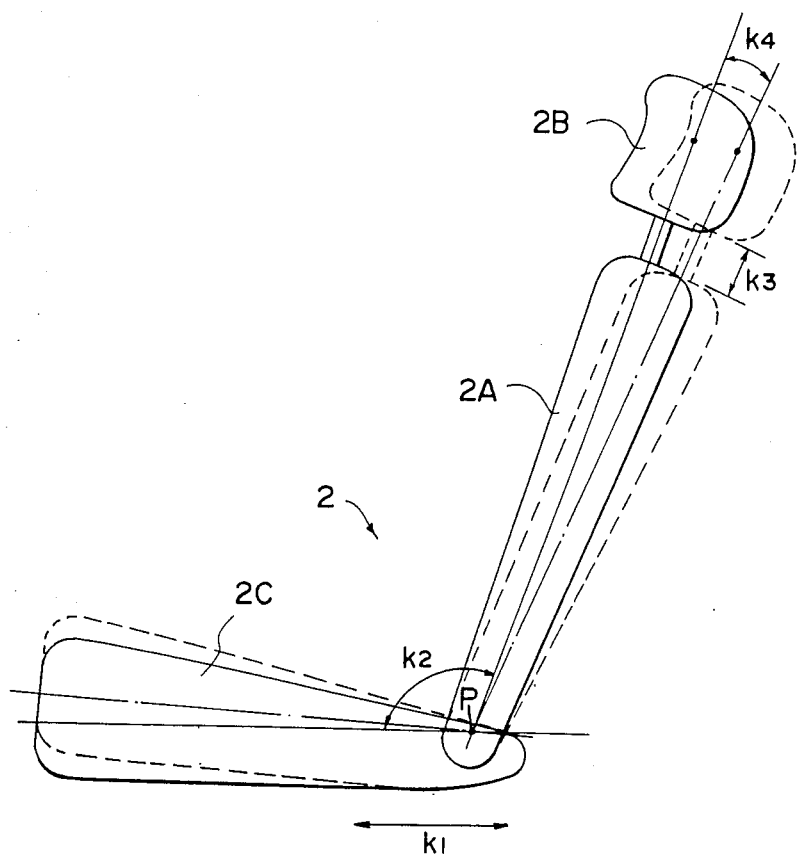
FIG.4 is a side view illustrating displacements of seat parts.

A seat back tilting mechanism, a head rest upward/downward movement mechanism and a head rest tilting mechanism of the seat 2 are similarly driven by respective motors, and photo-sensors detect values corresponding to the movement of these motors. Accordingly, by counting the numbers of pulses inputted from the seat forward/backward displacement detector 18A, the seat back tilt displacement detector 18B, the head rest upward/downward displacement detector 18C and the head rest tilt displacement detector 18D, a forward/backward displacement $k_1$ of the seat cushion 2C from a reference position can be calculated. In addition, a reclining angle $k_2$, represented by a tilt of the seat back 2A relative to a horizontal line, a head rest upward/downward displacement $k_3$ represented by a distance between the upper end of the seat back and the lower end of the head rest 2B, and a forward/backward tilt displacement $k_4$ of the head rest 2B, shown in FIG. 4, are detected, and the detected signals are supplied to the microcomputer 14.

A standard optimum angular displacement from $\theta_1$ from a standard position of the right fender mirror 10 relative to a perpendicular direction and a standard optimum angular displacement $\theta_2$ from a standard position relative to a horizontal direction are calculated based on seat forward/backward displacement $k_1$ using the following basic formulas. These formulas are stored in a read-only memory (ROM) of the microcomputer 14.

$$\theta_1 = ak_1 + b \quad (1)$$

$$\theta_2 = mk_1 + n \quad (2)$$

where a, b, m and n are variables for determining amounts of correction from the basic when the seat position is adjusted forward/backward, the reclining angle is adjusted, the head rest position is adjusted upward/downward, and the head rest tilt angle is adjusted.

Assuming that the correction amounts are $a_1$, $b_1$, $m_1$ and $n_1$ when the seat is adjusted foward/backward, the basic formulas are corrected as follows:

$$\theta_{11} = a_1 k_1 + b_1 \quad (3)$$

$$\theta_{21} = m_1 k_1 + n_1 \quad (4)$$

When the seat is adjusted forward/backward and the reclining angle is also adjusted, the basic formulas are corrected as follows:

$$\theta_{12} = (a_1 + a_2)k_1 + b_1 + b_2 \quad (5)$$

$$\theta_{22} = (m_1 + m_2)k_1 + n_1 + n_2 \quad (6)$$

where $a_2$, $b_2$, $m_2$ and $n_2$ are correction amounts for the reclining angle adjustment.

Similarly, when the head rest is further adjusted upward/downward in addition to the above adjustments, the basic formulas are corrected as shown by formulas (7) and (8), and when the head rest is further adjusted forward/backward, that is, when all of the seat parts are adjusted, the basic formulas are corrected as shown by formulas (9) and (10).

$$\begin{cases} \theta_{13} = (a_1 + a_2 + a_3)k_1 + b_1 + b_2 + b_3 & (7) \\ \theta_{23} = (m_1 + m_2 + m_3)k_1 + n_1 + n_2 + n_3 & (8) \end{cases}$$

$$\begin{cases} \theta_{14} = (a_1 + a_2 + a_3 + a_4)k_1 + b_1 + b_2 + b_3 + b_4 & (9) \\ \theta_{24} = (m_1 + m_2 + m_3 + m_4)k_1 + n_1 + n_2 + n_3 + n_4 & (10) \end{cases}$$

Where $a_3$, $b_3$, $m_3$ and $n_3$ are correction amounts when the head rest is adjusted upward/downward, and $a_4$, $b_4$, $m_4$ and $n_4$ are correction amounts when the head rest is adjusted forward/backward.

In this manner, the basic formulas (1) and (2) are shown to have included correction factors for correcting the basic angular displacement in accordance with adjustments of the seat parts. In this way, the relation between the seat displacement $k_1$ and the optimum angle of the right fender mirror can be determined.

While only the basic formulas for the right fender mirror have been explained, the optimum angle of the left fender mirror, the optimum angle of the inner mirror, the optimum angle of the meter, the optimum angle of the blowing ports of the air conditioner and the optimum angle of the speaker can be expressed by similar basic formulas. While the basic formulas for determining the optimum angles of the vehicle equipment has been explained using the seat forward/backward displacement $k_1$, they may be similarly expressed by the reclining angle $k_2$, the head rest upward/downward displacement $k_3$ or the head rest tilt displacement $k_4$.

Figure 5:
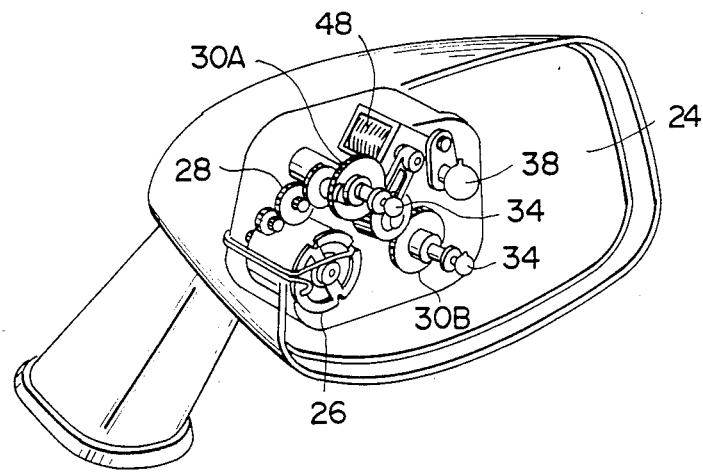
FIG. 5 is a partially sectional perspective view of a mechanism for displacing an angular position of a fender mirror.
Figure 6:
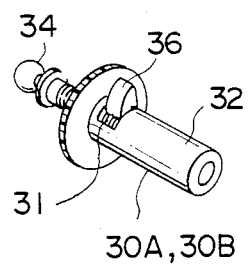
FIGS. 6 to 9 illustrate major parts of the mechanism shown in FIG. 5.

Based on the corrected basic formulas, the microcomputer 14 calculates the optimum angular displacement $\theta_1$ and $\theta_2$ of the right fender mirror, and a drive signal is fed to a right fender mirror driving apparatus. The driving apparatus may be constructed as shown in FIGS. 5 to 9. Referring to FIG. 5, a reversible motor 26 is mounted on the back of the mirror 24 and the rotation of the motor 26 is transmitted to gears 30A and 30B through a reduction gear mechanism 28. As shown in FIG. 6, the gears 30A and 30B each respectively have an axially extending cylindrical member 32 in which a pivot screw 34 is inserted. The cylindrical member 32 has a hole 31 at a portion thereof and an action gear 36 mounted on the hole 31 and threadedly engaged with the pivot screw 34 is arranged not to move along the axial direction of the pivot screw 34. Thus, as the gears 30A and 30B rotate, the pivot screw 34 moves axially forward or backward.

Figure 7:
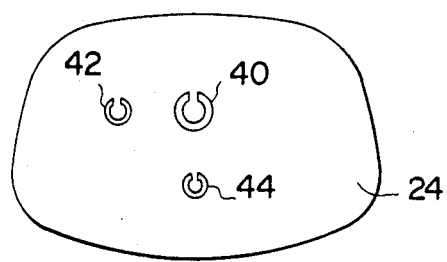
Figure 8:
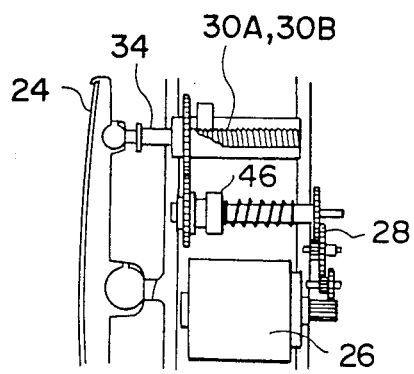
Figure 9:
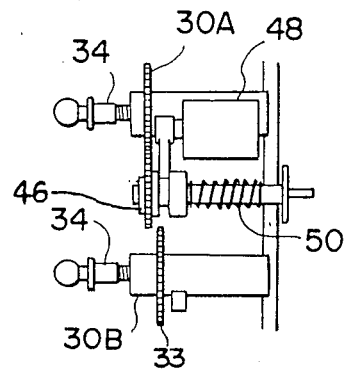

Referring to FIG. 7, a fixing point 40 is arranged at a center on the back of the mirror 24 and a fixing pivot 38 is fitted to the fixing point 40. On the left of the fixing point 40, a horizontal force point 42 is arranged, and a vertical force point 44 is arranged below the fixing point 40. The end of the pivot screw 34 of the gear 30A is fitted to the horizontal force point 42 and the end of the pivot screw 34 of the gear 30B is also fitted thereto. As shown in FIG. 8, the rotation of the motor 26 transmitted through the reduction gear 28 is further transmitted to the gear 30A or 30B by a change gear 46, which, as shown in FIG. 9, is axially moved forward or backward by the energization or deenergization of a solenoid 48. For example, the change gear 46 is engaged with the gear 30A by a biasing force of a coil spring 50 disposed on the shaft of the change gear 46, and when the solenoid 48 is energized, the change gear 28 is engaged with the gear 33 by the movement of the change gear 46 which is against the biasing force of the coil spring 50.

Accordingly, by energizing or deenergizing the solenoid 48 based on the drive signals from the microcomputer 14 which are produced in accordance with the displacements of the position and the angle of the seat 2, and driving the motor 26 for a predetermined time period, the mirror 24 is rotated around the fixing point 40 as the pivot screw 34 advances or retracts so that the horizontal angle $\theta_1$ and the vertical angle $\theta_2$ are set and the mirror 24 is adjusted to the optimum angular position to the driver.

When the vertical angle and the horizontal angle of the mirror 24 are changed, the angular displacement are sequentially detected by multiplexer 57 based on the signals inputted from a vertical angle sensor 47 and a horizontal angle sensor 49 as shown in FIG. 2 and the detected signal is A/D-converted by an A/D converter 58 and the microcomputer 14 controls the displacement of the mirror 24.

The angle displacement mechanism for the right fender mirror 10 can also be manually driven. The selection of manual/automatic operation is effected by an automatic/manual selection switch 52. When the automatic/manual selection switch 52 is switched to the manual position, the microcomputer 14 is switched to a manual operation status. A selection signal for the drive mechanism is applied to the microcomputer 14 by a selection switch 54 which comprises a movable terminal 54A and five stationary terminals 54B, 54C, 54D, 54E and 54F. The stationary terminals 54B, 54C, 54D, 54E and 54F allow setting of the angular displacements for the meters 4, the blowing ports of the air conditioner 6, the inner mirror 8, the right fender mirror 10 and the left fender mirror 12, respectively. For example, after the movable terminal 54A of the selection switch 54 has been connected to the stationary terminal 54B to allow the angular displacement of the right fender mirror 10, a vertical-horizontal selection switch 56 is actuated to displace the right fender mirror 10 to the selected angular position. The vertical-horizontal selection switch 56 comprises a movable terminal 56A and four stationary terminals 56B, 56C, 56D and 56E. By connecting the movable terminal 56A to the stationary terminal 56B, 56C, 56D or 56E, the right fender mirror 10 is angularly disposed upward, downward, leftward or rightward, respectively.

The meter 4, the blowing ports of the air conditioner 6 and the left fender mirror 12 selected by the selection switch 54 may be angularly displaced by the subsequent actuation of the switch 56.

The adjusted positions of the meter 4, the blowing ports of the air conditioner 6, the inner mirror 8, the right fender mirror 10 and the left fender mirror 12 after the respective angular displacing mechanism have been driven by these manual operations, are stored in a memory in the microcomputer 14. Correction amounts are calculated based on these driven positions of the angular displacing mechanism for the meter 4, the blowing ports of the air conditioning 6, etc. calculated from the displacements of the seat 2. The correction amounts are stored in another memory. The correction amounts are necessary because the amounts of adjustment of the seat parts and the sitting condition of the driver do not always conform to each other depending on the physical features of the driver. By actuating a correction switch, the correction amounts are stored in a random access memory (RAM) of the microcomputer. Numeral 61 denotes a correction amount reset switch for resetting the correction amounts.

When the angular displacement of the right fender mirror 10 is to be substantially automatically adjusted, the correction amounts stored in the memory are used to drive the angular displacement mechanism of the right fender mirror 10 to the optimum angular position to the driver. When the angular displacing mechanism is to be automatically driven in accordance with the correction amounts, the correction switch 59 for allowing the microcomputer 14 to calculate the correction amounts is actuated. A memory access selection switch 60 for allowing the activation of the seat forward/backward movement mechanism in accordance with the calculated correction amounts can also be actuated.

Figure 10:
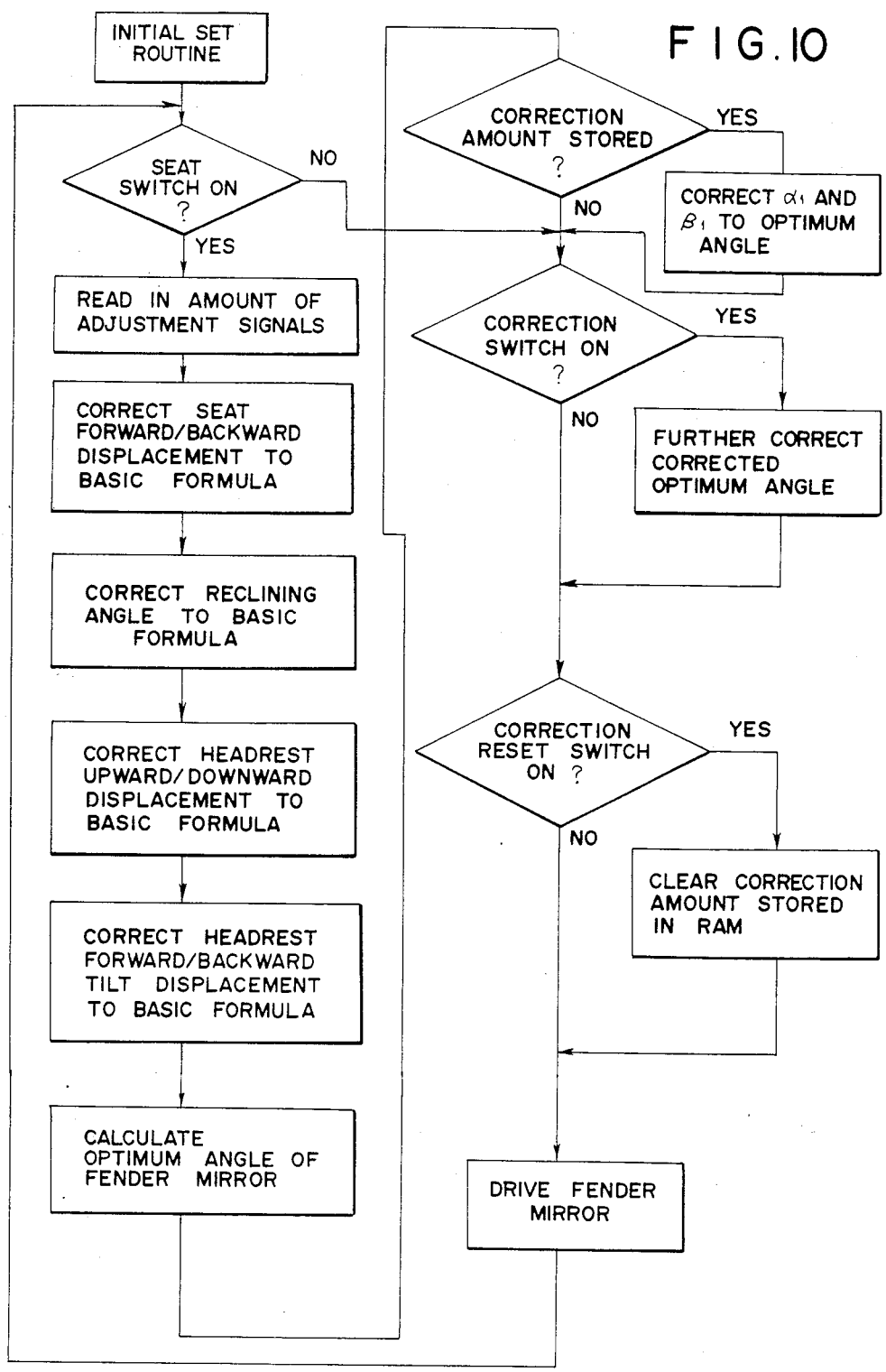
FIG. 10 is a flow chart showing an operation of a first embodiment.

The microcomputer 14 is programmed to operate in accordance with a flow chart shown in FIG. 10. When the manual position is selected by the automatic/manual selection switch 52, actuations of the seat control switch 54 and the fender mirror control switches are detected, and the back mirror, etc. are driven to the selected angular positions using driving motors motors.

On the other hand, when the automatic position is selected by the automatic/manual selection switch 52, the optimum angles and angular displacements are calculated based on the basic formulas. If the memory access selection switch 60 is on at this time, the optimum angles are calculated with the correction amounts stored in the memory being taken into consideration. Thereafter, the angle of the fender mirror is calculated and the fender mirror is angularly displaced by the motor disposed therein. The positions of the angularly displaced right fender mirror are sequentially detected by the vertical angle sensor 47 and the horizontal angle sensor 49 shown in FIG. 2 and the equality thereof to the calculated angles is determined. The angular displacement of the right fender mirror is continued until the equality is detected. When the positions of the right fender mirror detected by the vertical angle sensor 47 and the horizontal angle sensor 49 coincide with the calculated angles, the motor for driving the right fender mirror is stopped.

The operation of the present embodiment thus constructed is now explained.

When the driver sites on the seat 2, the driver displaces the seat 2 to the optimum position to the driver by actuating the seat control switches 16 such as seat forward/backward movement switch 16A and seat back tilt switch 16B. If the automatic/manual selection switch 52 is switched to the manual position, the driver actuates the selection switch 54 to select the right fender mirror and then adjusts the right fender mirror to the optimum angular position to the driver by actuating the vertical/horizontal selection switch 56.

On the other hand, when the driver switches the automatic/manual selection switch 52 to the automatic position, an initial set routine such as a reset of the RAM of the microcomputer is carried out as shown in FIG. 10. Then, the on-off condition of the seat switch 21 (FIG. 2) is checked for detecting if the driver is sitting or not, and if the seat switch is on, amount of adjustment signals indicative of the amounts of adjustment of the seat parts are read in. When the seat cushion, the seat back or the head rest has been adjusted, the basic formulas (1) and (2) are corrected to the formulas (3) (4), (5) (6), (7) (8) or (9) (10) and the optimum angular displacements $\theta_1$ and $\theta_2$ of the fender mirror are calculated based on the final formulas. Then, it is determined if the correction amounts are stored in the RAM, and if they are stored the correction amounts $\alpha_1$ and $\beta_1$ are added to the optimum angular displacements $\theta_1$ and $\theta_2$, respectively. If the correction switch 59 is further actuated, the corrected optimum angles $\theta_1+\alpha_1$ and $\theta_2+\beta_1$ are further corrected and the corrected angles are stored in the RAM. If the correction reset switch 61 is actuated, the corrected optimum angular displacements are reset to the original angular displacements $\theta_1$ and $\theta_2$ and the correction amounts stored in the RAM are cleared. The optimum angular displacements or the corrected optimum angular displacements thus calculated are converted to a fender mirror drive signal which is fed to the driver to automatically drive the fender mirror to the optimum angular position.

In the illustrated embodiment, the basic formulas for the right fender mirror are stored in the ROM. By storing a plurality of basic formulas for the respective vehicle equipments, the angular positions of the other vehicle equipments such as the inner mirror, the speaker and the blowing ports of the air conditioner can be automatically adjusted in a similar manner.

A second embodiment of the present invention is now explained. In the same manner as in previously described first embodiment, the pesent embodiment comprises the seat driving apparatus driven by the actuation of the seat control switches, the seat displacment detectors, the vehicleequipment driving apparatus, the processing circuit and the vehicle equipment displacement detectors. The only difference resides in the basic formulas used. In the present embodiment, the height H of the driver and the seat forward/backward displacement $k_1$ are used in the following basic formula.

$$H = a'k_1 + b' \quad (11)$$

where a and b as those used in variable as those used in the basic formulas (1) and (2) described above and they determined by the constants $a'_1$, $a'_2$, $a'_3$, $a'_4$ and the constants $b'_1$, $b'_2$, $b'_3$, $b'_4$. This formula takes into account the assumption that a taller driver will displace a seatl more from a reference position.

The basic formula (11) is stored in the ROM which further stores the optimum angle of the vehicle equipment (e.g. the right fender mirror) which corresponds to the height of the driver.

Figure 11:
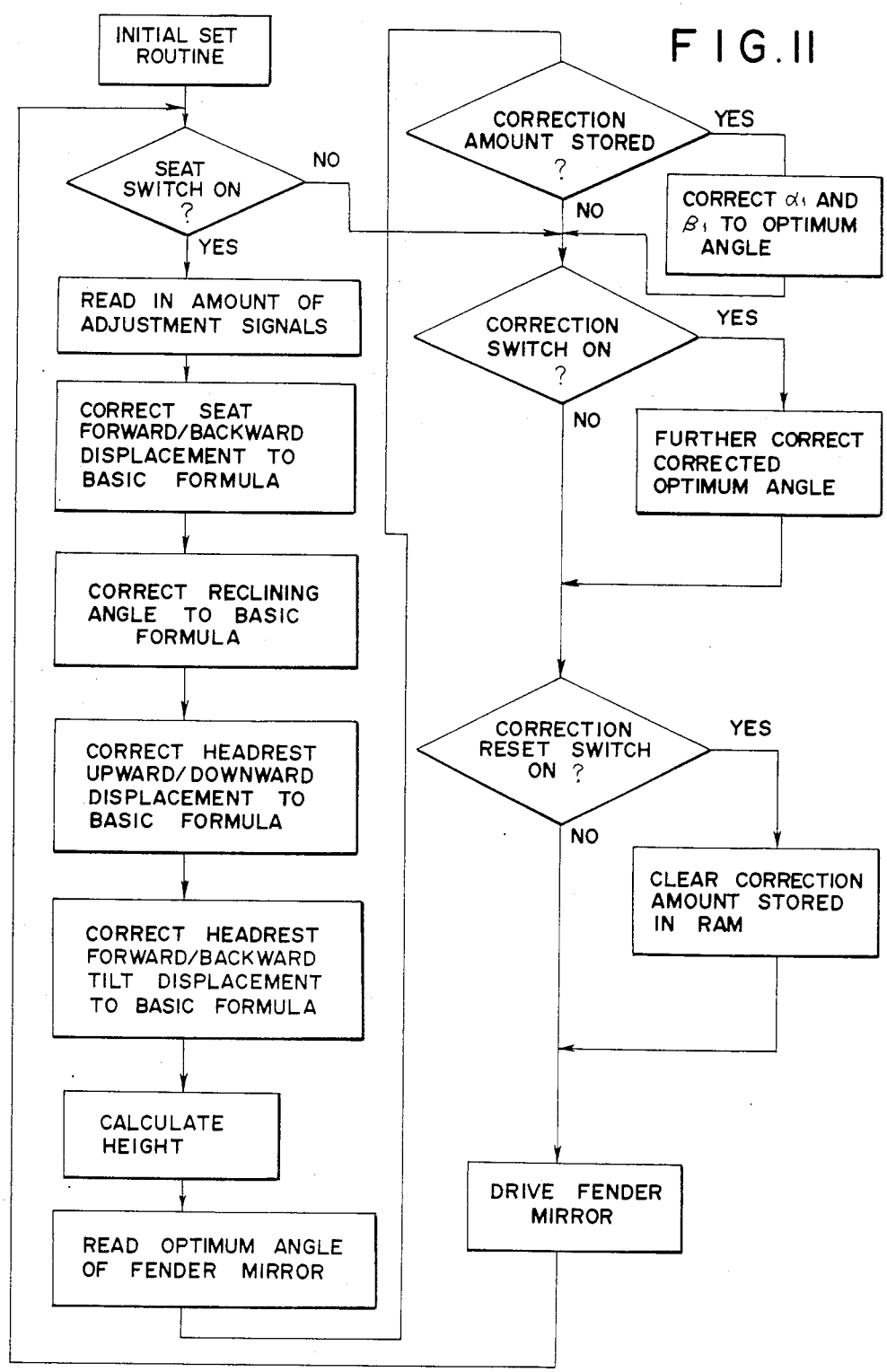
FIG. 11 is a flow chart showing an operation of a second embodiment.

Referring to FIG. 11, the operation of the present embodiment is now explained. When the automatic/manual selection switch 52 is switched to the automatic position, the initial set routine such as reset of the RAM of the microcomputer 14 starts and the on-off condition of the seat switch 21 is checked for detecting if the driver is sitting on the seat or not. If the seat switch is on, the amount of adjustment signals indicative of the amounts of adjustment for the seat parts are read in. If the seat cushion, the seat back or the head rest has been adjusted, the terms of the basic formula (11) reflect following formula (12), (13), (14) or (15).

$$H = a'_1 k_1 + b'_1 \quad (12)$$

$$H_2 = (a'_1 + a'_2)k_1 + b'_1 + b'_2 \quad (13)$$

$$H_3 = (a'_1 + a'_2 + a'_3)k_1 + b'_1 + b'_2 + b'_3 \quad (14)$$

$$H_4 = (a'_1 + a'_2 + a'_3 + a'_4)k_1 + b'_1 + b'_2 + b_3 + b'_4 \quad (15)$$

Based on the finally corrected formula, the height of the driver is calculated, and the optimum angle of the right fender mirror is read out based on the calculated height in accordance with the prestored optimum angle of the right fender mirror for the height. Then, it is determined if the correction amounts are stored in the RAM, and if they are stored, the correction amounts $\alpha_1$ and $\beta_1$ are added to the optimum angles $\theta_1$ and $\theta_2$, respectively. If the correction switch 59 is further actuated, the corrected optimum angles $\theta_1 + \alpha_1$ and $\theta_2 + \beta_1$ are further corrected and the corrected angles are stored in the RAM. If the correction reset switch 61 is actuated, the corrected optimum angles are reset to the original angles $\theta_1$ and $\theta_2$ and the correction amounts storedin the RAM in the RAM are cleared. The optimum angles or the corrected optimum angles thus calculated are converted to a fender mirror drive signal which is fed to the driver to automatically drive the fender mirror to the optimum angular position.

While the optimum angles of the right fender mirror for the height are stored in the illustrated embodiment, the other vehicle equipments can be simultaneously automatically adjusted in accordance with the basic formula with a number of the stored optimum angles of the vehicle equipment for the height such as the optimum angles of the left fender mirror for the height and the optimum angles of the inner mirror for the height. The basic formula may use the relation between the height and the reclining angle $k_2$, the relation between the height and a head rest upward/downward displacement $k_3$ or the relation between the height and the head rest forward/backward tilt displacement.

A third embodiment of the present invention is now explained. In the same manner as in the first and second embodiments, the present embodiment comprises the seat driver driven by the actuation of the seat control switches, the seat displacement detectors, the vehicle equipment drivers, the processing circuit and the vehicle equipment displacement detectors. The difference resides in that an eye position of the driver is calculated.

In the present embodiment, the microcomputer counts the number of pulses from the seat forward-/backward displacement detector 18A, the seat back tilt displacement detector 18B, the head rest upward/downward displacement detector 18C and the head rest tilt displacement detector 18D, and the eye position of the driver sitting on the seat 2 is calculated based on those counts.

Figure 12:
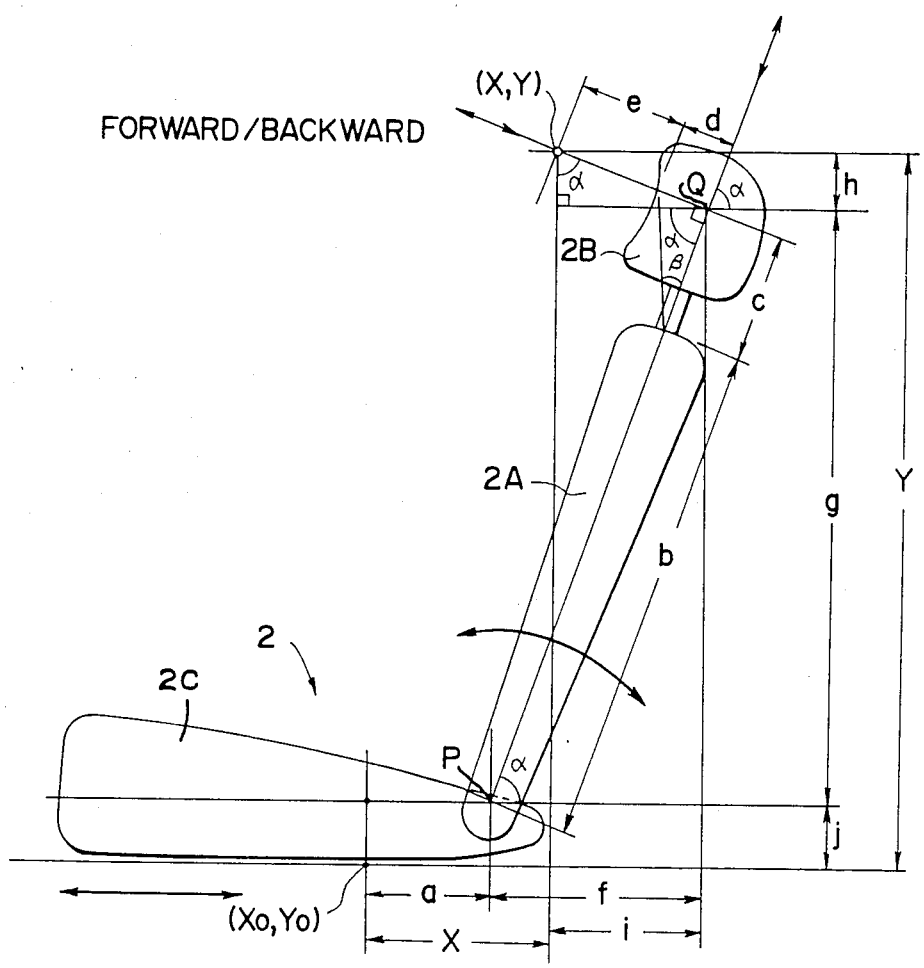
FIG. 12 is a diagrammatical explanatory view showing a process to calculate an eye position of a driver from the displacements of the seat in a third embodiment.

FIG. 12 is a digrammatical explanatory view showing relations between the seat parts, for calculating the eye position of the driver by the microcomputer. A distance X from a preselected origin ($X_0$, $Y_0$) under the seat 2 to the eye position of the driver as measured in the direction of the X-axis is represented by:

$$X = a + f - i$$

where a is a distance along the X-axis from the origin ($X_0$, $Y_0$) to a support axis P of the seat back 2A, f is a distance along the X-axis from the support axis P of the seat back 2A to a point of intersection Q of a lengthwise extended line of the seat back 2A and a perpendicular thereto drawn from the eye position (X, Y) of the driver. This distance is represented by $(b+c) \cos \alpha$ where b is the length of the seat back 2A and c is the length from the upper end of the seat back 2A along the lengthwise extended line thereof to the point of intersection Q on the headrest 2B, and i is a sine of the distance from the point of intersection Q to the eye position (X, Y) of the driver and it is represented by $(e+d) \sin \alpha$, where d is the distance from the point of intersection Q to a head contact plane of the head rest 2B and e is the distance between a rear portion of the head and the eyes of the driver. The distance d from the point of intersection Q to the head contact plane of the head rest 2B is represented by $c \tan \beta$, where c is the length between the upper end of the seat back 2A and the point of intersection Q.

A distance Y measured along the Y-axis from the origin ($X_0$, $Y_0$) to the eye position of the driver is represented by:

$$Y = j + g + h$$

where j is the distance along the Y-axis from the origin ($X_0$, $Y_0$) to the support axis P of the seat back 2A, g is the distance along the Y-axis from the support axis P of the seat back 2A to the point of intersection Q, which distance is represented by $(b+c) \sin \alpha$, and h is a cosine of the distance from the point of intersection Q to the eye position (X, Y) of the driver and represented by (e+d) cos α.

Thus, by detecting the seat forward/backward displacement a by the seat forward/backward displacement detector 18A, the tilt angle α of the seat back 2A by the seat back tilt displacment detector 18B, the upward/downward displacement c of the head rest 2B by the head rest upward/downward displacement detector 18C and the tilt angle β of the head rest 2B by the head rest tilt displacement detector 18D, the eye position (X, Y) of the driver can be calculated by the microcomputer 14 based on the other constants b and e.

As the eye position of the driver is calculated by the microcomputer 14, drive signals for driving the meters 4, the blowing ports of the air conditioner 6, the inner mirror 8, the right fender mirror 10 and the left fender mirror 12 to the optimum angular positions to the driver are produced based on the calculated eye position and they are fed to the angular displacing mechanism of the meter 4, the air conditioner 6 and the above-stated mirrors, such as back mirrors.

Figure 13:
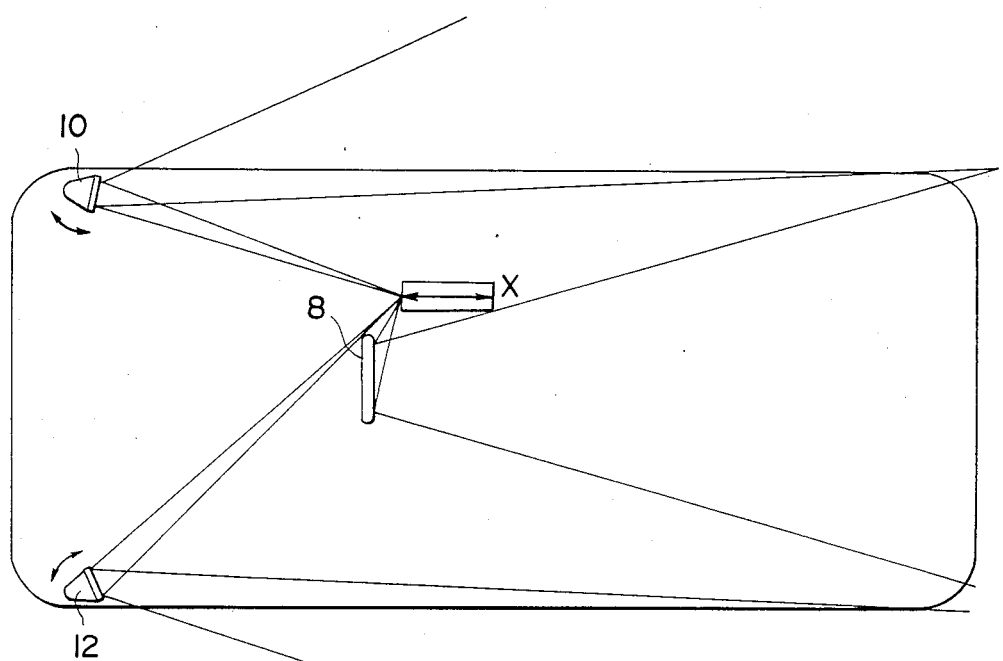
FIGS. 13 and 14 are respective schematic views showing a movable range of the eye position of the driver.
Figure 14:
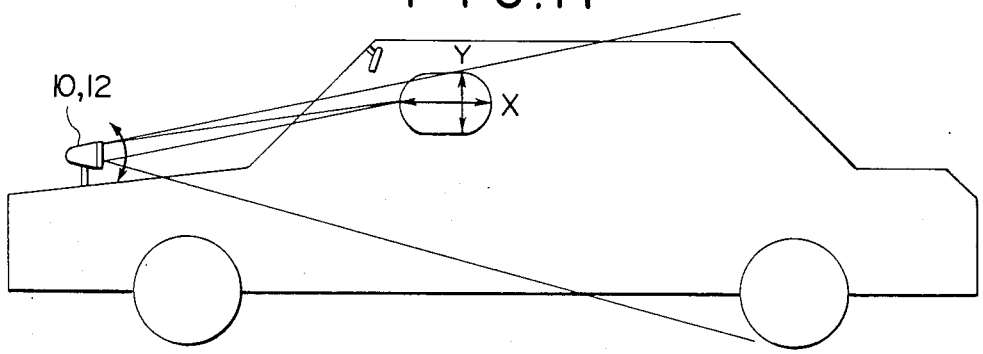
Figure 15:
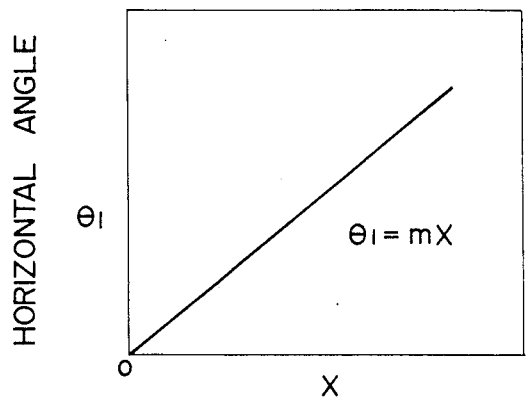
FIGS. 15 and 16 are respective graphical representations indicating relations between the eye position of the driver and the angular displacement of the fender mirror.
Figure 16:
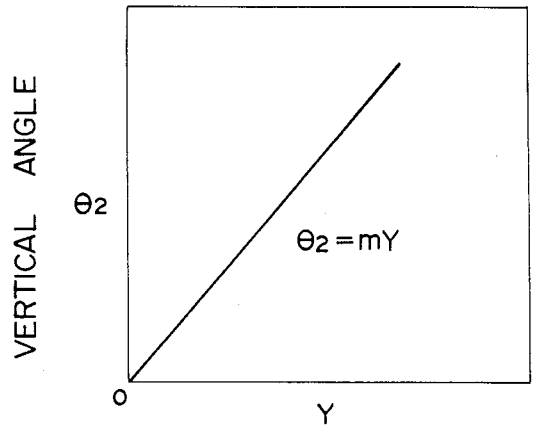

Taking the fender mirror as an example and referring to FIGS. 13 and 14, the solenoid 48 is energized or deenergized based on the drive signals sent from the microcomputer 14 in accordance with the X-direction and Y-direction (directions along X- and Y-axes, respectively) displacements of the eye position of the driver caused by the displacements of the position and the angle of the seat 2. By drivingthe motor 26 for a predetermined time period, the mirror 24 is rotated around the fixing point 40 to the horizontal angle $\theta_1$ (=mx) and the vertical angle $\theta_2$ (=my) as the pivot screw 34 advances or retract as shown in FIG. 15 and 16 so that the mirror 24 is angularly adjusted to the optimum angular position to the driver.

In the present embodiment, the correction amounts are calculated and stored in the other memory.

The correction amouants are calculated to correct the eye position of the driver determined by the position and the angle of the seat 2 because the distance 3 from the head contact point of the head rest 2B to the eyes shown in FIG. 12 is changed in accordance with the physical different features of drivers.

Figure 17:
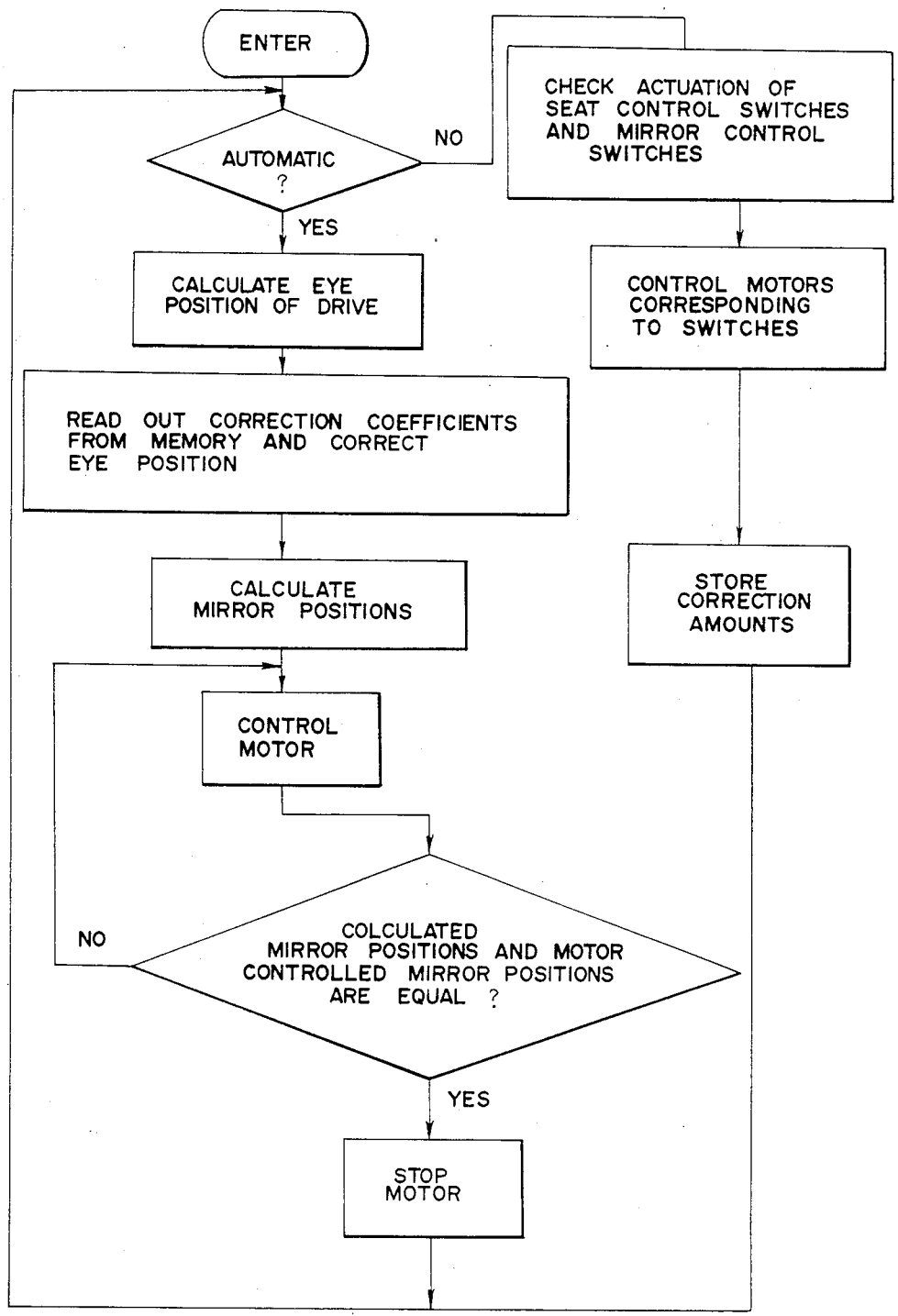
FIG. 17 is a flow chart illustrating an operation of the third embodiment.

The microcomputer 14 is programmed to operate in accordance with a flow chart shown in FIG. 17. When the manual position is selected by the automatic/manual selection switch 52, an actuation of the seat control switches 54 and the fender mirror control switches are detected, and based on the detection, the fender mirror, etc. are subsequently driven to the selected angular positions by the motors. The correction amount derived from a difference between the selected angle of the fender mirror and the angle calculated based on the position and the angle of the seat is stored in the memory by the actuation of the correction switch 58.

On the other hand, when the automatic position is selected by the automatic/manual selection switch 52, the eye position of the driver is calculated on the basis of the position and the angle of the seat. If the memory access selection switch 60 is on, the eye position of the driver is calculated in accordance with the correction amount stored in the memory. Then, the angles of the fender mirror are calculated based on the calculated eye position of the driver, and the fender mirror is angularly displaced by the motor in accordance with the calculated angles. The positions of the angularly displaced fender mirror are sequentially detected by the vertical angle sensor 47 and the horizontal angle sensor 49 shown in FIG. 2 and the equality of the angles adjusted to the calculated angles is checked. The fender mirror is angularly displaced until the equality is detected. When the positions of the fender mirror detected by the vertical angle sensor 47 and the horizontal angle sensor 49 coincide with the calculated angles, the motor for driving the fender mirror is stopped.

The operation of the present embodiment thus constructed is now explained.

When the driver sits on the seat, the driver actuates the seat control switch 16 such as the seat forward-/backward movement switch 16A and the seat back tilt switch 16B to displace the seat 2 to the optimum position for the driver. When the automatic/manual selection switch 52 is switched to the manual position, the driver selects one of the selection switches 54, and based on the selection the driver actuates the vertical/horizontal selection switch 56 to drive the meter 4, the blowing ports of the air conditioner 6, the inner mirror 8, the right fender mirror 10 or the left fender mirror 12 to the optimum angular position for the driver.

When the driver switches the automatic/manual switch 52 to the automatic position and actuates the seat control switches such as the seat forward/backward movement switch 16A and the seat back tilt switch 16B, the seat 2 can be displaced for the optimum position to the driver. The seat displacment detectors 18 including the seat forward/backward displacement detector 18A and the seat back tilt displacement detector 18B detect the manner of displacement of the seat 2 and the detected displacement signals are inputted to the microcomputer 14. The microcomputer 14 calculates the eye position (X, Y) of the driver sitting on the seat 2 in accordance with the detected signals to displace the meter 4, the blowing ports of the air conditioner 6, the inner mirror 8, the right fender mirror 10 and the left fender mirror 12 to the optimum angular positions for the driver on the basis of the calculated eye position.

If the automatic/manual selection switch 52 is switched to the manual position and the correction switch 58 is on, the correction amount based on a difference between the eye position of the driver calculated by the microcomputer 14 and an actual eye position of the driver is stored in the memory of the microcomputer 14. When the driver turns on the memory access selection switch 60 and actuates the selection switch 54 to displace the seat 2, the microcomputer 14 calculates the eye position of the driver sitting on the seat 2 based on the detected signals from the seat displacement detector 18 and the correction amount·so that the meter 4, the blowing ports of the air conditioner 6, the inner mirror 8, the right fender mirror 10 and the left fender mirror 12 are displaced to the optimum angular positions in accordance with the considered physical features of the respective drivers being taken into consideration.

In the above stated embodiment, the meter, the blowing ports of the air conditioner and the fender mirrors are angularly displaced to cause the displacements of the position and the angle of the seat. It is not necessary to angularly displace all of those but at least one of those may be angularly displaced.

In the illustrated embodiment, the meter, the blowing ports of the air conditioner and the fender mirrors are angularly displaced in accordance with the correction amount due to the considered physical features of the drivers. However, the means for calculating the correction amount is not always necessary to attain the advantages of the present invention.

From the foregoing description, it should be apparent to one skilled in the art that the above-described embodiment is but one of many possible specific embodiments which can represent the applications of the principles of the present invention. Numerous and varied other arrangements can be readily devised by those skilled in the art without departing from the spirit and scope of the invention.

What is claimed is:

1. An optimum angle adjusting apparatus for equipment in a movable vehicle comprising:
    means for detecting an amount of adjustment of at least one part of a vehicle seat from a reference position, and for producing signals indicative of said amount of adjustment;
    processing means for storing a first basic formula which represents a relation between an optimum angular position of said equipment of said vehicle and said amount of adjustment, and for calculating an optimum angle of said equipment based on signals from said detecting means; and
    driving means for driving said equipment to said optimum angular position in accordance with the calculated optimum angle from said processing means.

2. An optimum angle adjusting apparatus for movable vehicle equipment as set forth in claim 1, wherein said processing means includes means for storing a plurality of formulas, including said first formula and a second formula indicative of a relation between a height of the driver and said optimum angular position, and means for executing said second formula to determine a height of the driver for calculating an optimum angular position of said vehicle equipment.

3. An optimum angle adjusting apparatus for vehicle equipment as set forth in claim 1, wherein said processing means includes means for storing a plurality of formulas, including said first formula and an eye position formula indicative of a relation between an eye position of the driver and said optimum angular position, and means for executing said eye position formula to determine an eye position of the driver for calculating an optimum angular position of said vehicle equipment.

4. An optimum angle adjusting apparatus for vehicle equipment as set forth in claim 1, where said processing means includes means for correcting terms of said first formula in accordance with at least one of a reclining angle of a seat back from a reference position, an upward/downward displacement of a head rest from a reference position, and a forward/backward displacement of said head rest from said reference position thereof.

5. An optimum angle adjusting apparatus for vehicle equipment as set forth in claim 1, wherein said processing means includes: means for storing three formulas including said first formula and two additional formulas which respectively represent a relationship between said optimum angular position, and (1) a height of the driver, and (2) an eye position of the driver, and means for calculating said optimum angular position using one of said three formulas.

6. An optimum angle adjusting apparatus for vehicle equipment as set forth in claim 1, wherein said processing means includes means for correcting terms of said formulas in accordance with at least one of a vehicle seat cushion forward/backward displacement, a seat back reclining angle, a head rest upward/downward displacement and a head rest forward/backward displacement.

7. An optimum angle adjusting apparatus for vehicle equipment as set forth in claim 1, further comprising:
    a power seat having parts that are automatically adjusted by said drive means; and
    a plurality of amount of adjustment detectors arranged in said parts of said power seat, each of said detectors including a photo-interrupter, a light emitting element, and a photo-sensing element arranged on opposite sides of said photo-interrupter to detect when said photo-interrupter passes therebetween.

8. An apparatus as in claim 1, wherein said means for detecting an amount of adjustment of at least one vehicle seat part detects a forward/backward displacement of said vehicle seat from said reference position.

9. An apparatus as in claim 1, wherein said vehicle equipment includes at least one of a fender mirror, an inner mirror, a blowing port of an air conditioner, an audio speaker, and a meter.

10. An apparatus as in claim 1, wherein said detecting means comprises a light emitting element, a photo-sensing element, and a photo-interrupter arranged between said light emitting element and said light sensing element, said photo-interrupter being coupled to said vehicle seat to move in proportion with movements of said vehicle seat.

* * * * *